United States Patent [19]

Chang et al.

[11] Patent Number: 5,021,906
[45] Date of Patent: Jun. 4, 1991

[54] PROGRAMMABLE AIR BEARING SLIDER INCLUDING MAGNETIC READ/WRITE ELEMENT

[75] Inventors: Shuo H. Chang, Briarcliff Manor; Ferdinand Hendriks, Yorktown Heights; Vijayeshwar D. Khanna, Ossining; Eric G. Lean, Chappaqua, all of N.Y.

[73] Assignee: International Business Machines Corporation, Armonk, N.Y.

[21] Appl. No.: 429,890

[22] Filed: Oct. 31, 1989

[51] Int. Cl.$^5$ .............................................. G11B 5/60
[52] U.S. Cl. .................................................. 360/103
[58] Field of Search ........................ 360/102, 103, 104

[56] References Cited

U.S. PATENT DOCUMENTS

| | | | |
|---|---|---|---|
| 3,180,944 | 4/1965 | Stover | 360/103 |
| 3,201,526 | 8/1986 | Wessels et al. | 360/103 |
| 3,632,900 | 1/1972 | Kurzweil, Jr. | 360/103 |
| 3,678,482 | 7/1972 | Billawala | 360/103 |
| 3,706,861 | 12/1972 | Giel | 360/ |
| 3,732,552 | 5/1973 | Walraven | 360/103 |
| 3,863,124 | 1/1975 | Pierce et al. | 360/103 X |
| 3,992,576 | 11/1976 | Sugiura | 360/103 |
| 4,080,636 | 3/1978 | Ravizza | 360/77 |
| 4,143,405 | 3/1979 | Kubuta | 360/77 |
| 4,188,645 | 2/1980 | Ragle et al. | 360/104 X |
| 4,212,044 | 7/1980 | Plotto | 360/103 |
| 4,532,802 | 7/1985 | Yeack-Scranton et al. | 73/432 |
| 4,555,739 | 11/1985 | Le Van et al. | 360/103 |
| 4,583,135 | 4/1986 | Kimura | 360/77 |
| 4,605,977 | 8/1986 | Matthews | 360/103 |
| 4,669,011 | 5/1987 | Lemke | 360/103 |
| 4,910,621 | 3/1990 | Matsudo et al. | 360/103 |

FOREIGN PATENT DOCUMENTS

| | | | |
|---|---|---|---|
| 242597A | 10/1987 | European Pat. Off. | |
| 0105094 | 11/1989 | European Pat. Off. | 360/103 |
| 2141738 | 7/1979 | Fed. Rep. of Germany | 360/103 |
| 522418 | 1/1977 | Japan | 360/75 |
| 53-42020 | 4/1978 | Japan | |
| 5760566 | 4/1982 | Japan | 360/103 |
| 57-210479 | 6/1982 | Japan | |
| 58-153270 | 4/1983 | Japan | |
| 0006475 | 1/1987 | Japan | 360/103 |
| 0229478 | 9/1989 | Japan | 360/103 |
| 1433943 | 4/1976 | United Kingdom | 360/75 |

OTHER PUBLICATIONS

Randeraat and Sc Herington, *Piezeloelectric Ceramics*, 1974, pp. 40-45, published by Mullard Ltd., Torington Place, London.
Research Disclosure, Disclosed Anonymously, Capacitive Height Control for Maintaining a Magnetic Head Closely Spaced from a Magnetic Layer, Jun. 1981, No. 206, pp. 242-243.
Elsner, G. et al. "Magnetic Head with Retractable R/W Element", IBM Tech. Discl. Bull., vol. 27, No. 7B, Dec. 1984, pp. 4573-4574.
Stokes, K. A. et al. "Magnetic Head with Piezoelectric Positioning", IBM Tech. Discl. Bull., vol. 16, No. 5, Oct. 1973, p. 1492.
Pontius, D. J., "Force Transducer for Disk-Wear Testing", IBM Tech. Discl. Bull., vol. 26, No. 10B, Mar. 1984, pp. 5425-5426.
Method for Controlling Flyheight of Relative Motion Air Bearing, Research Disclosure, Oct. 1986, No. 270.
Mc Connell et al., Flexible Magnetic Head Slider, IBM Tech. Discl. Bull., vol. 30, No. 8, Jan. 1988, pp. 5425-5426.

*Primary Examiner*—David J. Severin
*Attorney, Agent, or Firm*—Bernard E. Shay; David Aker

[57] ABSTRACT

An air bearing slider according to the present invention provides a programmable slider wherein the fly height of the read/write head may be conveniently controlled using electrical signals. In an air bearing slider according to the present invention, the rear of the slider is made to fly lower by altering the angle of attack of a rear air bearing region. In one embodiment of the present invention, a slider configuration includes a first air bearing region at the leading edge of the slider and a second air bearing region at the slider's trailing edge. The first air bearing region includes a tapered region. A deformable central region, including a non air bearing surface, joins the first and second air bearing regions and controls the relative angle between the air bearing surfaces. The relative angle is adjusted by deforming the central region using a layer of piezoelectric material which overlays the central region. A conventional read/write head is placed on the rear portion of the second air bearing region.

37 Claims, 6 Drawing Sheets

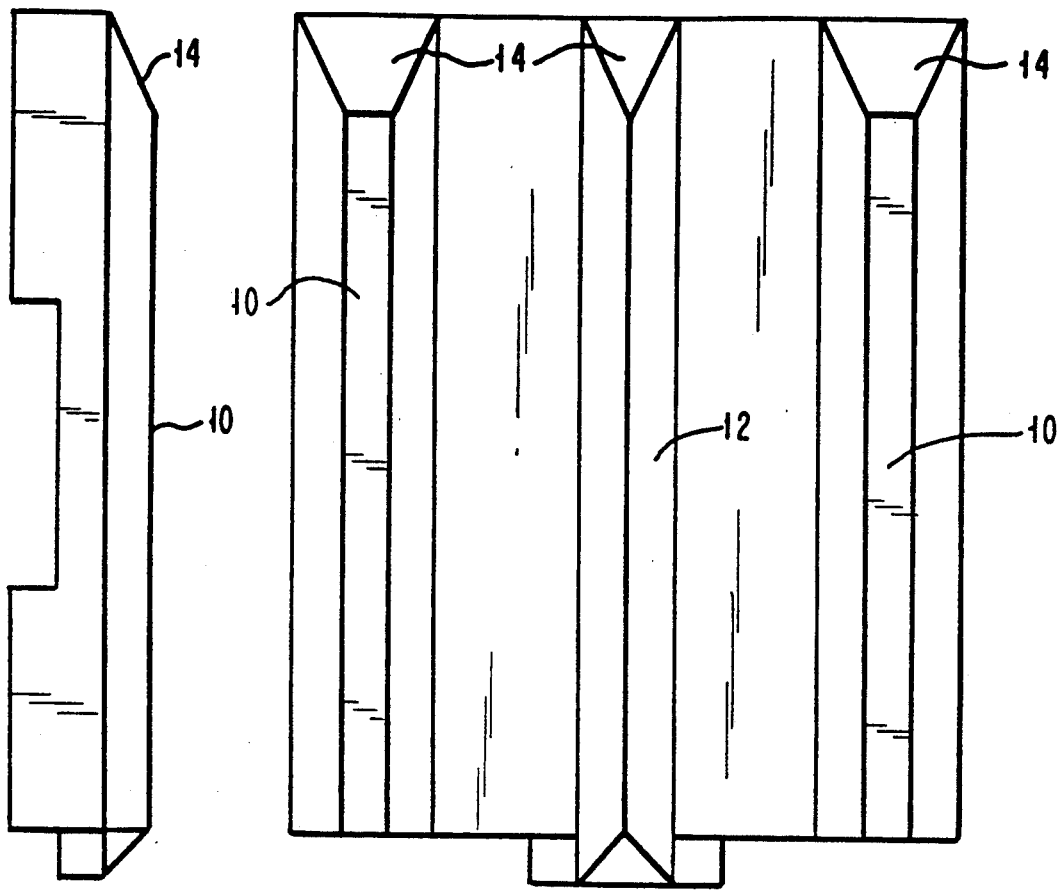
FIG. 2
PRIOR ART
FIG. 1
PRIOR ART
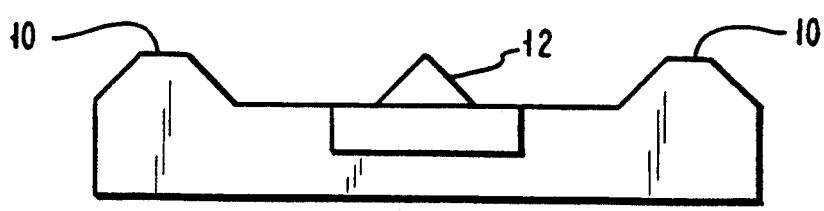
FIG. 3
PRIOR ART

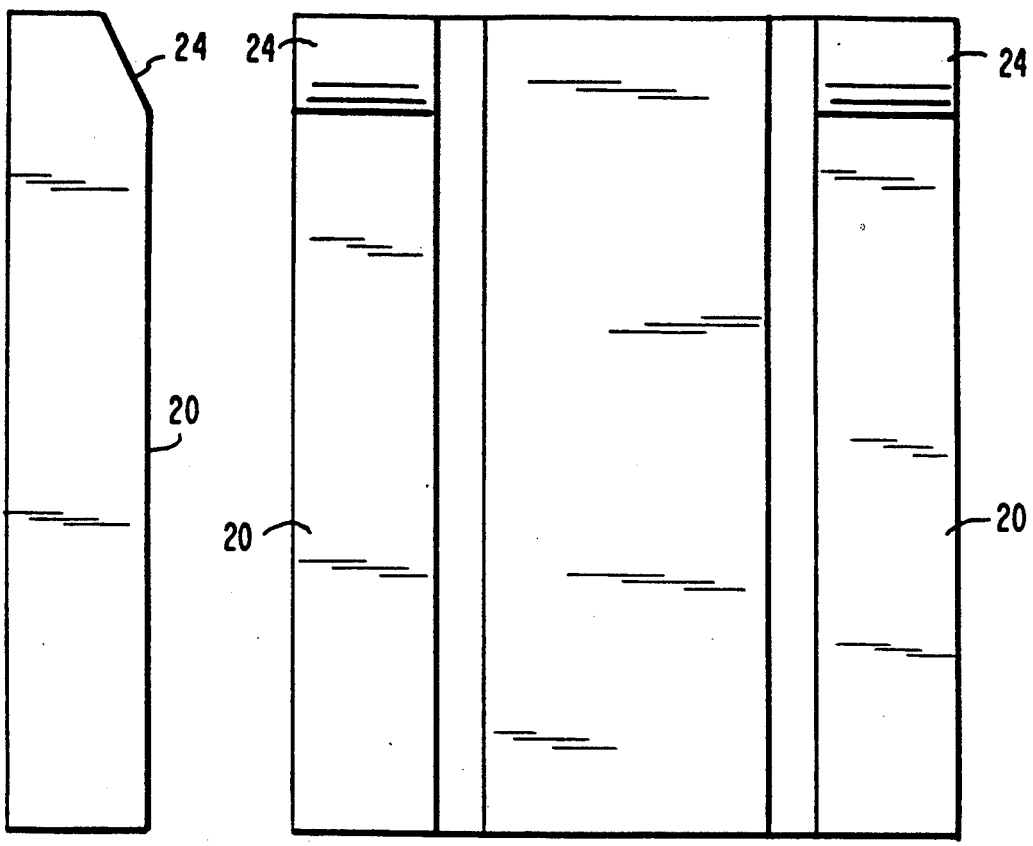
FIG. 5
PRIOR ART
FIG. 4
PRIOR ART
FIG. 6
PRIOR ART

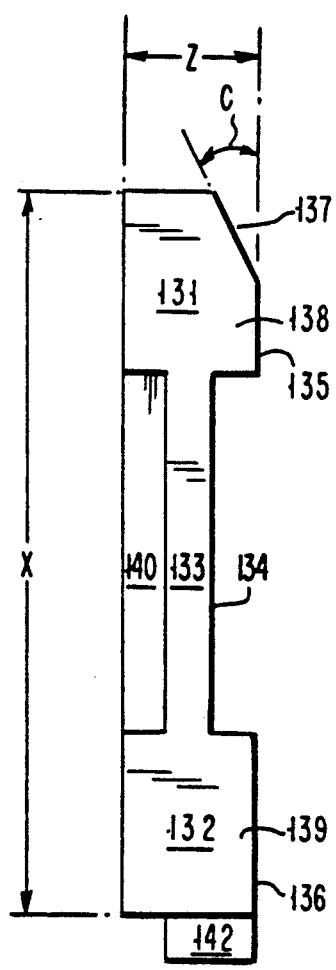
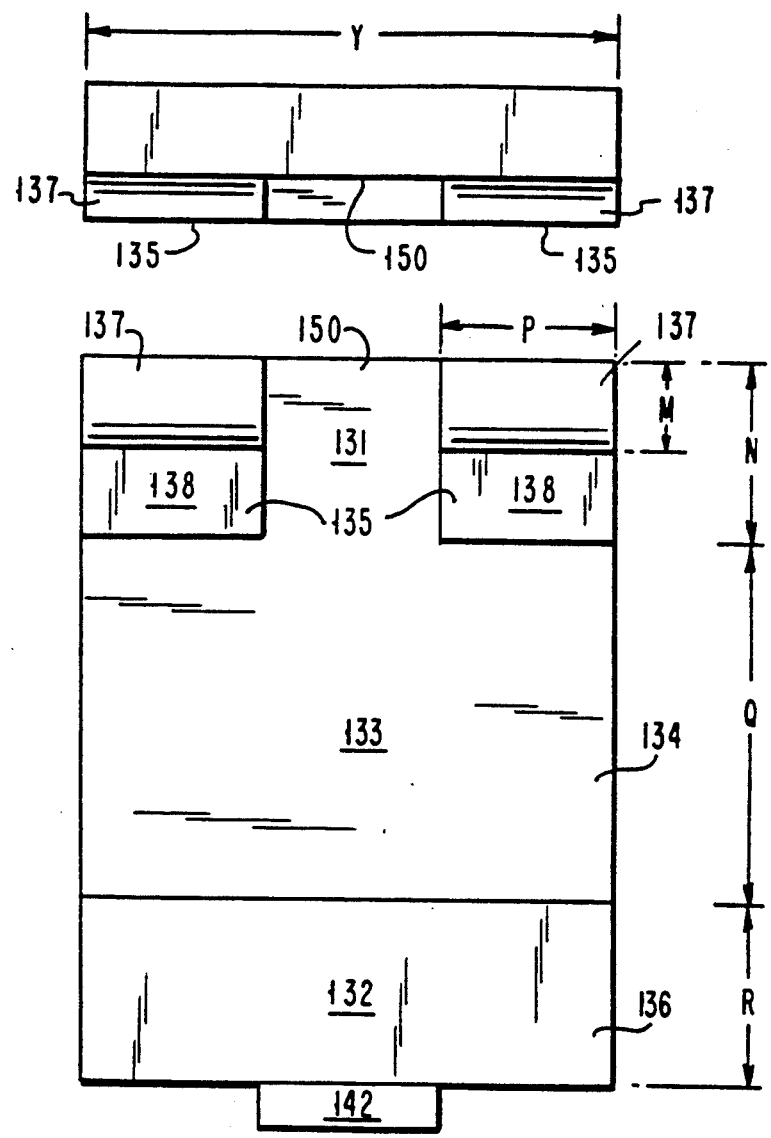
FIG. 12
FIG. 11
FIG. 10

PROGRAMMABLE AIR BEARING SLIDER INCLUDING MAGNETIC READ/WRITE ELEMENT

The present invention relates in general to air bearing sliders and more particularly to a programmable air bearing slider wherein the fly height of the read/write head is controlled by electronically changing the relative angle between the front and rear air bearing surfaces of the Air Bearing Slider.

BACKGROUND OF INVENTION

The present invention relates to programmable or electronically controllable air bearing sliders. Air bearing sliders are primarily used as mounting platforms for read/write heads in, for example, hard disk drives. In such environments it is necessary to carefully control the height of the read/write head. That is, it is necessary to control the distance between the read/write head and the disk surface to optimize the read/write characteristics.

Increased recording densities result in the necessity of designing read/write heads which fly extremely close to the recording surface. In order to move the read/write heads closer to the disk, it is generally necessary for the sliders themselves to fly closer to the disks. Unfortunately, the slider fly height is limited by head-disk interactions which increases as the slider gets closer to the disk. As the number of head disk interactions increase, the reliability of the system decreaes. Head disk interactions may be caused by, for example, debris on the disk or slider or by disk asperities.

Therefore, it would be advantageous to design a slider which reduces the number of head-disk interactions. Reducing the number of head-disk interactions may be accomplished by, for example, designing a programmable slider which flies low during a read or write operation and returns to a safe height between read/write operations. A disk drive generally includes a number of read/write heads, each mounted on a separate slider. A specific head (and thus slider) is normally used for reading or writing less than 1 percent of the time. Thus, programmable designs provide a substantial increase in reliability when compared to designs wherein the read/write head flies low all the time.

Air bearing sliders have been designed to adjust the fly height of the read/write head using a number of methods. For example, the read/write head may be mounted to the slider using a piezoelectric coupling which lowers the head independent of the slider. In other air bearing sliders, the fly height is controlled through the use of piezoelectric elements in the slider structure to change the curvature of the air bearing surface, increasing or reducing the fly height.

In those sliders wherein the fly height is programmable, a figure of merit is the relative change in fly height per unit slider deflection. This figure of merit may be expressed in microns of fly height per microradians of deflection. In this type of slider, it is desirable to achieve a maximum change in fly height per unit slider deflection. By increasing the change in fly height per unit deflection, the sensitivity of the programmable slider is increased. In addition, the voltage variation required to adjust the slider fly height is minimized.

U.S. Pat. No. 3,732,552 is directed to a magnetic head system operable in a fluid medium (e.g. air). The magnetic head is supported on a support member which uses a biasing element to hold the support member the desired distance from the record carrier (e.g. a hard disk). The fly height is varied by using the changes in the curvature of the support surface. In particular, a piezoelectric insert is used to vary the curvature of the support surface in accordance with an electric signal. This arrangement includes a center air bearing surface.

U.S. Pat. No. 3,678,482 is directed to a recording head mounted on an air bearing slider wherein the faces of the air bearing slider are designed to improve the attitude of the slider. A narrow slot is included in the air bearing slider as a means of providing hydrodynamic separation between the trailing edge of the main face and the leading edge of the satellite edge.

U.S. Pat. No. 4,555,739 is directed to a self loading air bearing slider assembly including a cross rail from which side rails and a middle rail extend. The surfaces between the middle rail and the side rails are intended to provide a sub ambient pressure region. When the slider is in flight, the repelling action of the air bearing surfaces surrounding the subambient region and attracting action of the subambient pressure region supplement the stabilizing force of the load arm. Both the middle and side rails extend the entire length of the slider.

U.S. Pat. No. 4,605,977 illustrates a slider including a plurality of rails extending longitudinally which provide the air bearing surface and a channel parallel to the motion of the data track. A flexible beam is affixed to the leading edge of the channel, providing a cantilever structure. The magnetic head is mounted on the free end of the cantilever structure. A pair of oppositely polarized piezoelectric crystals are mounted on the cantilever assembly. Thus when energized by an electrical source the cantilever beam is flexed upwards or downwards, thereby changing the distance between the magnetic head and the disk.

U.S. Pat. No. 3,863,124 describes a spacing control apparatus for maintaining the spacing between a signal transducer and a magnetic recording surface. Spacing between the signal transducer and the magnetic surfaces is maintained using electrical control signals to drive the spacing control device and thereby cause deformation of its surfaces. The elements of the spacing control apparatus are comprised of a deformable material such as a piezoelectric material. Thus, when the control signal becomes more negative, one element bends upward away from the gas flow while a second element bends downward towards the gas flow layer. This deformation causes the signal transducer to rise. When an opposite polarity signal is applied, causing the first element to bend downward into the gas flow layer and the second element to bend upward away from the gas flow, the signal transducer falls.

Other types of sliders include constant fly height air bearing slider sliders such as the Winchester or Coronado slider, which are not programmable. In the Winchester and Coronado slider two rails run the length of the slider and include tapered front air bearing surfaces. In the Winchester slider a third rail runs down the center of the slider between the two air bearing rails. A pair of non air bearing surfaces separate the center rail from the air bearing rail. In this arrangement, the read/write head is attached to the rear of the slider. A further improvement of this design is found in the Coronado slider, wherein the side air bearing rails include a pair of read/write heads, and the center rail is eliminated.

The present invention is intended to overcome the problems encountered in the prior art by electronically adjusting the relative angle of attack of the first, and second air bearing surfaces.

SUMMARY OF THE INVENTION

In one embodiment of the present invention, a slider configuration includes a first air bearing region at the leading edge of the slider and a second air bearing region at the slider's trailing edge. The first air bearing region includes a tapered region at its leading edge. In this embodiment, there is a deformable central region, including a non air bearing surface, that joins the first and second air bearing regions and controls the relative angle between them. Finally, this embodiment includes means to deform the central region, which may consist of electromechanical, thermoelectric, electrostrictive, piezoelectric or any other suitable means.

More particularly, in a preferred embodiment of the present invention, the first and second air bearing regions are separated by a central, non air bearing region. The central region is recessed to render it non air bearing. The central, non air bearing region further includes a piezoelectric element overlying and capable of deforming the central region. Further, a conventional read/write head is placed on the rear portion of the second air bearing region. Finally, the front air bearing region includes tapered portions at the leading edge of the slider.

In a further embodiment of the present invention, the front and rear regions may include multiple air bearing surfaces, separated by non air bearing surfaces.

An air bearing slider according to the present invention provides a programmable slider wherein an increasing curvature, with the convex portion of the slider toward the disk, lowers the fly height of the read/write head.

In an air bearing slider according to the present invention, the rear of the slider is made to fly lower by altering the angle of attack of a rear air bearing region.

BRIEF DESCRIPTION OF THE DRAWINGS

The novel features of the invention are set forth with particularly in the appended claims. The invention itself, however, as to organization and method of operation, together with further objects and advantages thereof, may best be understood by reference to the following description taken in conjunction with the accompanying drawings in which FIG. 1 illustrates a three rail Winchester air bearing slider.

FIG. 2 illustrates a side view of the slider in FIG. 1.

FIG. 3 illustrates an end view of the slider in FIG. 1.

FIG. 4 illustrates a Coronado two rail air bearing slider.

FIG. 5 illustrates a side view of the slider in FIG. 4

FIG. 6 illustrates an end view of the slider in FIG. 4

FIG. 10 illustrates a programmable air bearing slider according to the present invention, including multiple front air bearing pads.

FIG. 11 illustrates a side view of the slider in FIG. 10.

FIG. 12 illustrates an end view of the slider in FIG. 10.

DESCRIPTION OF THE PREFERRED EMBODIMENT

A slider according to the present invention has separate front and rear air bearing pads instead of the conventional straight full length rails. Conventional slider arrangements are illustrated in FIG. 1 and FIG. 2. FIG. 1 illustrates a Winchester three rail slider, wherein the air bearing surfaces comprise the side rails 10 of the slider. While the center rail 12 is substantially non air bearing. FIG. 4 illustrates a Coronado air bearing slider wherein the side rails 20 provide the air bearing surfaces, no center rail is included. Both the Winchester and Coronado sliders include taper flats 14 and 24 at the leading edge of the slider.

Figure 8:
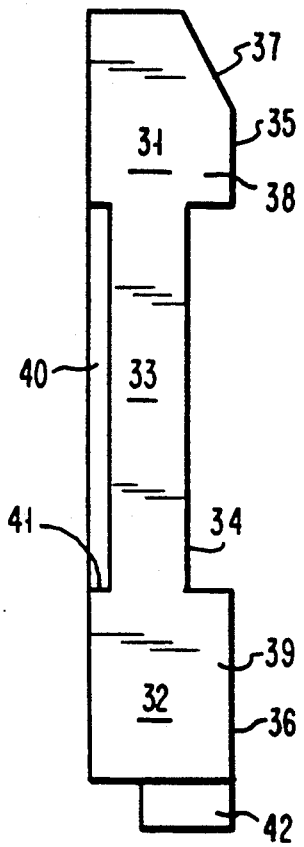
FIG. 8 illustrates a side view of the slider in FIG. 7.
Figure 7:
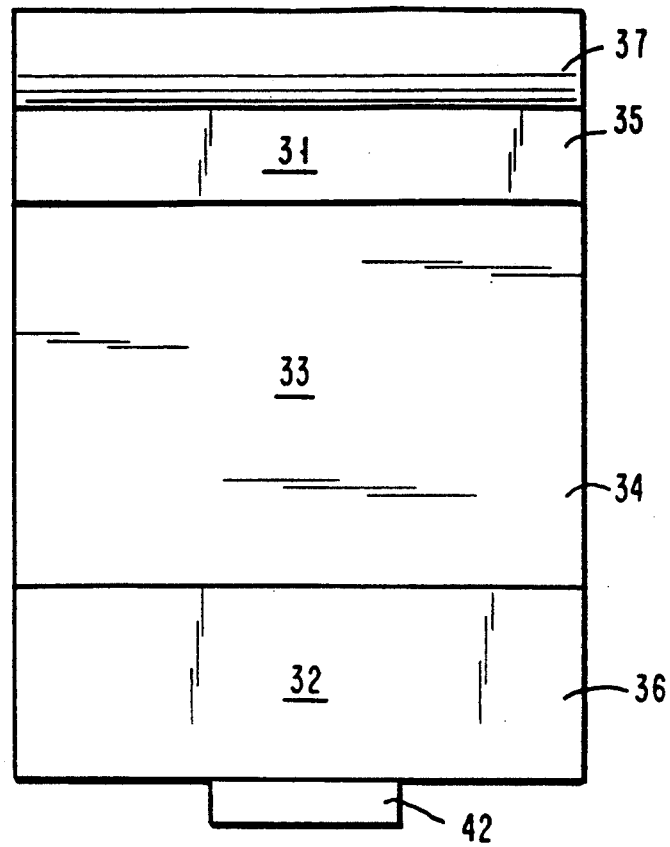
FIG. 7 illustrates a programmable air bearing slider according to the present invention.
Figure 9:
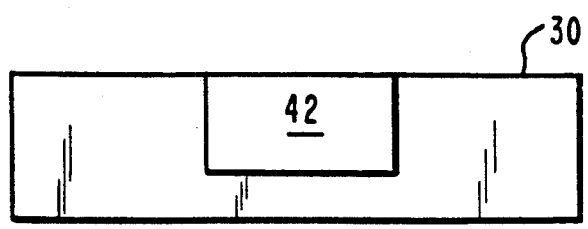
FIG. 9 illustrates an end view of the slider in FIG. 7.

According to a preferred embodiment of the present invention, illustrated in FIGS. 7-9, the air bearing side 30 of the slider includes first region 31 and second region 32, separated by central region 33. First region 31 and second region 33 are partially or wholly comprised of one or more pads that include air bearing surfaces 35 and 36. Third region 33 includes a recessed, substantially non air bearing surface 34 between the first and second air bearing surfaces. The depth to which surface 34 is recessed from air bearing surfaces 35 and 36 is sufficient to render surface 34 substantially non air bearing. First region 31 and second region 32 differ in that the air bearing surfaces on pads 38 and 39 in first region 31 have taper flats 37 at their leading edges while the air bearing surfaces on pad 39 in second region 32 do not include taper flats. The number, size and shape of pads 38 and 39 may be chosen to optimize certain desired performance characteristics, such as roll stiffness, stability and crash stop characteristics.

In the preferred embodiment, central region 33 of the slider further includes a piezoelectric element 40 capable of deforming central region 33 when excited by an electrical input signal. In the embodiment of FIG. 7, the central portion of the slider is deformed by utilizing the $d_{31}$ expansion mode of the piezoelectric material. A channel 41 is defined in the top portion of central region 33 wherein piezoelectric insert 40 is attached. It will be recognized that the piezoelectric material may be formed in any manner suitable to deform the central region and that any suitable expansion or contraction mode of the piezoelectric material may be used.

When central region 33 is deformed, the relative angle of attack of the first and second air bearing surfaces 35 and 36 changes, changing the height of the rear air bearing surface 36. Deforming central region 33 to create a positive crown reduces the height of second region 32. Central region 33 is said to have a positive crown when it is curved toward the magnetic surface (i.e. when the convex portion of central region 33 is toward the disk).

Ideally, in the present invention, the lift generated by first air bearing surface 35 is governed by the size and shape of taper flats 37. A positive slider load is normally applied near the center of the slider. Because the angle of attack of taper flats 37 is large (on the order of approximately 10 milliradians), any increase resulting from a deformation of central region 33 generates little or no increase in lift. Thus, the fly height of the first region 31 is not substantially affected by a change in the angle of attack of first air bearing surface 35. The lift generated by pads 39 in second region 32 is, however, a function of the angle of attack of second air bearing surface 36, since surface 36 does not include taper flats. Thus, deforming central region 33 with a positive crown, causes an increase in the angle of attack of the first air bearing surface 35 and a decrease in the angle of attack of second air bearing surface 36. Because the lift generated by the first pads 38 is not a function of the angle of attack of first air bearing surface 35, deformation of the central region 33 does not change the flying height of first region 31. However, since the lift generated by second pads 39 is a function of the angle of attack of air bearing surface 36, deformation of central region 33 to create a positive crown results in a momentary decrease in lift under second region 32. This decrease in lift is compensated by region 32 moving closer to the disk. Therefore, when a read/write head 42 is mounted on the rear of second region 32, it also moves closer to the disk when central region 33 has a positive crown.

Read/write head 42 may be an electromagnetic structure such as a wire wound head or thin film head. Such electromagnetic structures read data by converting magnetic flux changes detected as the head moves past a magnetic storage media to electrical signals. Conversely, data may be written to the magnetic storage media by converting electrical input signals to magnetic flux changes which are imprinted on the magnetic medium.

It will be noted that the ideal situation, described in the preceding paragraph, is almost impossible to achieve. Therefore, in actual practice, the fly height of first region 31 will change to a small degree with changes in the angle of attack of the first air bearing surface 35. However, since taper flats 37 substantially control the lift generated by first pad 38, the change in height resulting from changes the angle of attack of air bearing surface 35 will be minimal and can be substantially ignored. Depending on the load point, it will also be apparent that first region 31 and second region 32 support a substantially fixed portion of the total load, regardless of the fly height of each region or their relative angle of attack. Central region 33, being recessed on the side of the slider which includes first and second air bearing surfaces 35 and 36 (i.e. air bearing side 30), generates little or no lift on its own. Therefore, the contribution of central region 33 can be substantially ignored and the lift created by each air bearing surface depends primarily on its own fly height and angle of attack.

In a preferred embodiment of the present invention, illustrated in FIGS. 10-12, first region 131 includes two pads 138, one at each side of the region. A recessed, forward non air bearing surface 150 is placed between pads 138 of first region 131. The leading edge of air bearing surfaces 135 includes taper flats 137. In this embodiment, second region 132, includes single pad 139 covering the full width and length of second region 132. Central portion 133 of this embodiment, includes a recessed, non air bearing surface 134, which is connected to forward, non air bearing surface 150. By placing a conventional read/write head 142 behind the rear portion of second region 132 it is possible to achieve extremely small distances between the disk surface and read/write head.

Figure 13:
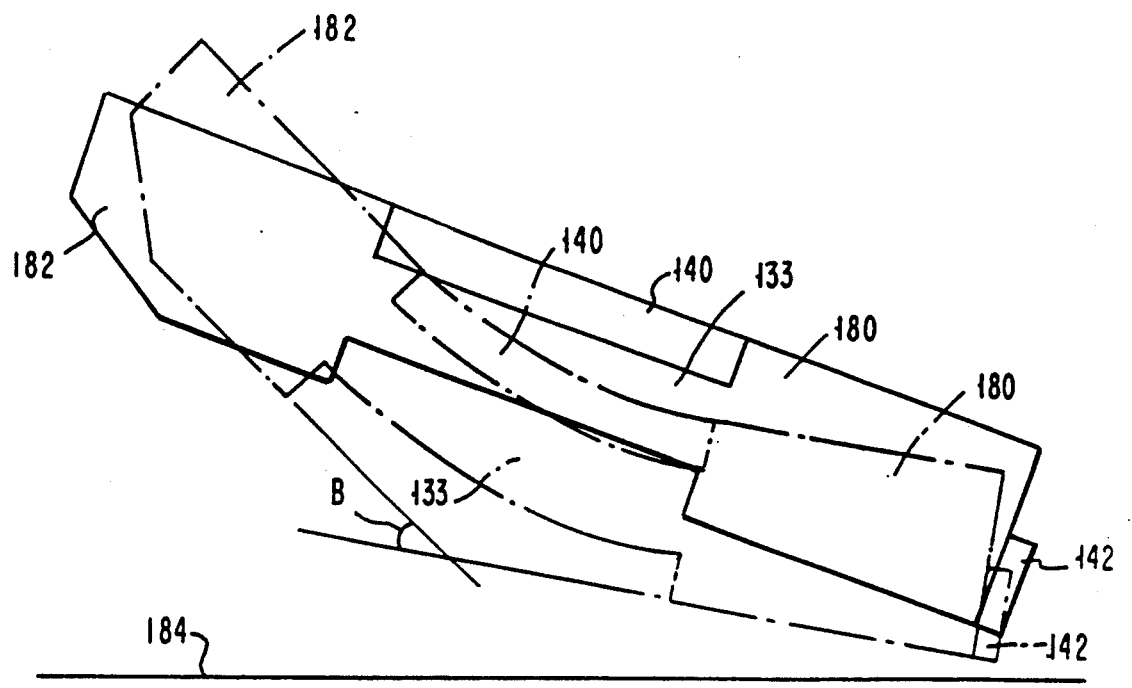
FIG. 13 illustrates an embodiment of the present invention both before and after deforming the central region to create a positive crown.

FIG. 13 illustrates an air bearing slider according to the present invention wherein the slider is configured in a first, unbowed arrangement 180 and in a second, bowed arrangement 182. In FIG. 13, a positive crown is introduced in central region 133 by exciting piezoelectric layer 140 using an electrical signal. It will be noted from FIG. 13 that read/write head 142 moves downward, closer to magnetic surface 184 as the degree of positive crown increases.

Simulation results for a slider having a form factor of approximately 4×3×1 millimeters, indicate that the distance between the disk surface and read/write head 142 (fly height) can be changed from approximately 250 to 50 nanometers by introducing a curvature (angle B in FIG. 13) of between approximately zero and 400 microradians in central region 133. The 400 micro-radian figure is a measure of the angle (angle B in FIG. 13) formed between front and rear air bearing surfaces 135 and 136 after stimulating piezoelectric region 140 with a voltage of sufficient magnitude to induce a positive crown in central region 133. The voltage required will, necessarily, be a function of the piezoelectric material chosen. In a slider having a form fact of approximately 2.5×1.6×0.4 millimeters, a curvature (angle B of FIG. 13) of between 0 and 400 microradians would be expected to modulate the fly height between approximately 185 and 50 nanometers. The form factor is an approximate measure (see FIGS. 11 and 12) of the length X by width Y by thickness Z of an air bearing slider.

In accordance with the present invention according to FIG. 10, it is also possible to increase the height of a read/write head. If piezoelectric layer 140 is driven such that a negative crown is introduced, the distance between the read/write head 142 and the surface of the magnetic medium is increased. In other words, by increasing the angle of attack of air bearing surface 136, second region 132 will fly higher, without substantially changing the fly height of first region 131.

The slider's flight characteristics may be adjusted by changing the size and shape of the pads. It is intended, according to the embodiment of the present invention illustrated in FIG. 10, that pads 138 and 139 are sufficiently thick to render surfaces 134 and 150 substantially non air bearing. Non air bearing surfaces 134 and 150 extend from the leading edge of the slider to second pad 139 and from the outer portions of the side of central region 133 to the center region 133, thus forming an approximate T shape.

It will be noted that a further embodiment, according to the present invention, could have a reverse layout from that illustrated in FIG. 10, wherein region 132 includes pads 138, while region 131 includes single pad 139. In this embodiment, the leading edge of pads 139 on region 131 would include taper flats.

Figure 14:
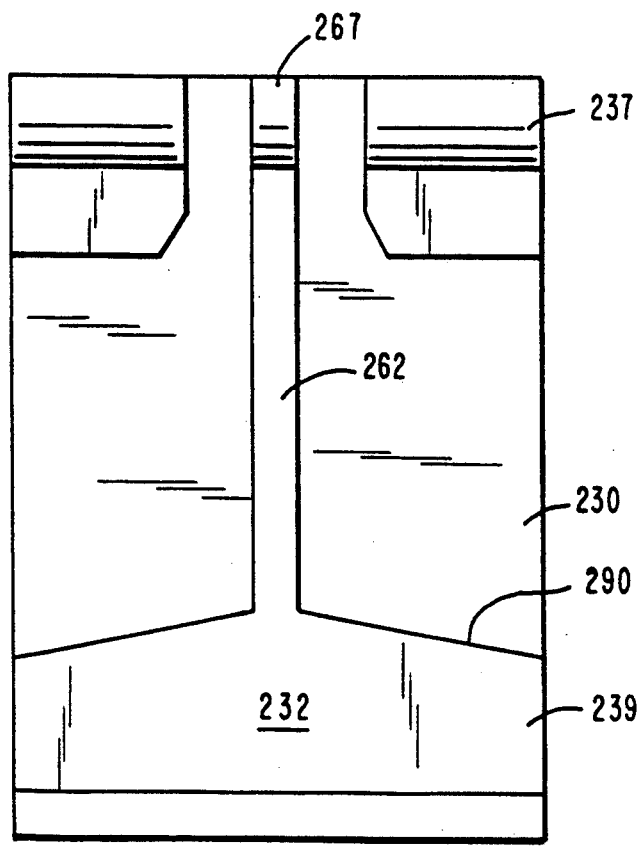
FIG. 14 illustrates a programmable air bearing slider according to the present invention, including a center, non air bearing rail.

In a further preferred embodiment of the present invention, illustrated in FIG. 14, a central rib 262 could be introduced to the air bearing side 230 of the slider. Central rib 262 may also include a taper flat 267 parallel to taper flats 237. Central rib 262 is designed to insure that forward edge 290 of second pad 239 does not dig into the magnetic surface during start and stop operations. In addition, central rib 262 prevents edge 290 from digging into the magnetic surface if the piezoelectric is overdriven, forcing second pad 239 into the surface of the magnetic disk. Central rib 262 is further designed to be so thin that it is functionally non air bearing, in accordance with the present invention.

Figure 15:
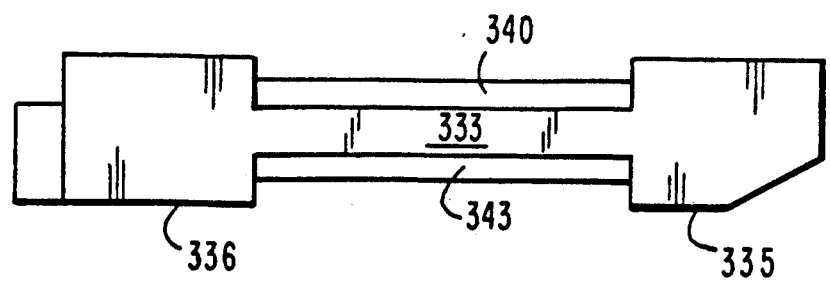
FIG. 15 illustrates a further embodiment of the present invention, including opposing, balanced piezoelectric regions.

In a further embodiment of the present invention, illustrated in FIG. 15, thermal warping may be reduced or eliminated. This warping is a result of mismatches between the coefficient of expansion of the piezoelectric and slider materials. In normal usage, the piezoelectric-ceramic combination may exhibit thermal warping similar to that found in bimetallic strips during changes in operating temperature. While thermal warping may be reduced by choosing a piezoelectric material with a coefficient of expansion similar to that of the ceramic material used to construct the slider, that is not always desirable. Further, choosing the piezoelectric material to match the ceramic is not always possible. An alternative method of compensating for thermal warping involves adjusting the piezoelectric driving voltage to compensate for temperature changes. However, such compensation schemes tend to be complicated, expensive and unreliable.

In the embodiment of FIG. 15, a second, piezoelectric region 343 is introduced, underlying central region 333 and opposing first piezoelectric region 340. Second piezoelectric region 343 is not driven by an external voltage and is, therefore, inactive. It will be noted that second piezoelectric region 343 is recessed below air bearing surfaces 335 and 336, to ensure that it remains substantially non air bearing in accordance with the present invention. The symmetry of this design will substantially reduce thermal warping of the slider.

In the embodiment of FIG. 15, it will be noted that the thickness of central region 333 may be decreased to accommodate second piezoelectric region 343 without substantially reducing the slider stiffness. For, example, a slider according to the embodiment of FIG. 10, having a form factor of approximately $2.5 \times 1.6 \times 0.4$ millimeters may have a ceramic central region 133 approximately 300 micrometers thick which is overlayed by an active piezoelectric region 140 approximately 100 micrometers thick. A finite element simulation of this embodiment indicates that the thermal warping would be expected to be in the range of approximately 2.16 microradians per degree centigrade. By including an inactive piezoelectric region 343 (as in FIG. 15) of approximately 100 micrometers, under ceramic central region 333, the thickness of central region 333 may be reduced to, approximately 200 micrometers. A finite element simulation of this arrangement indicates that the thermal warping could be reduced to approximately 0 microradians per degree centigrade. In actual practice, thermal warping of a slider having a form factor of approximately $4 \times 3 \times 1$ millimeters has been reduced by approximately an order of magnitude.

In preferred embodiments of the present invention, as described herein, it will occur to those of skill in the art that many known materials will be suitable for the manufacture of the piezoelectric region and the slider itself. For example, the piezoelectric regions may be comprised of a suitable Lead-Zirconate-Titanate compound such as PZT-4 (A trademark of the Vernitron Corp.), a Lead-Magnesium-Niobate compound may also be acceptable. The slider itself could, for example, be machined from a suitable ceramic material such as a Titanium Carbide-Alumina composite material. It is intended that these materials be disclosed as examples only and not as limitations on the scope of the present invention.

Figure 16:
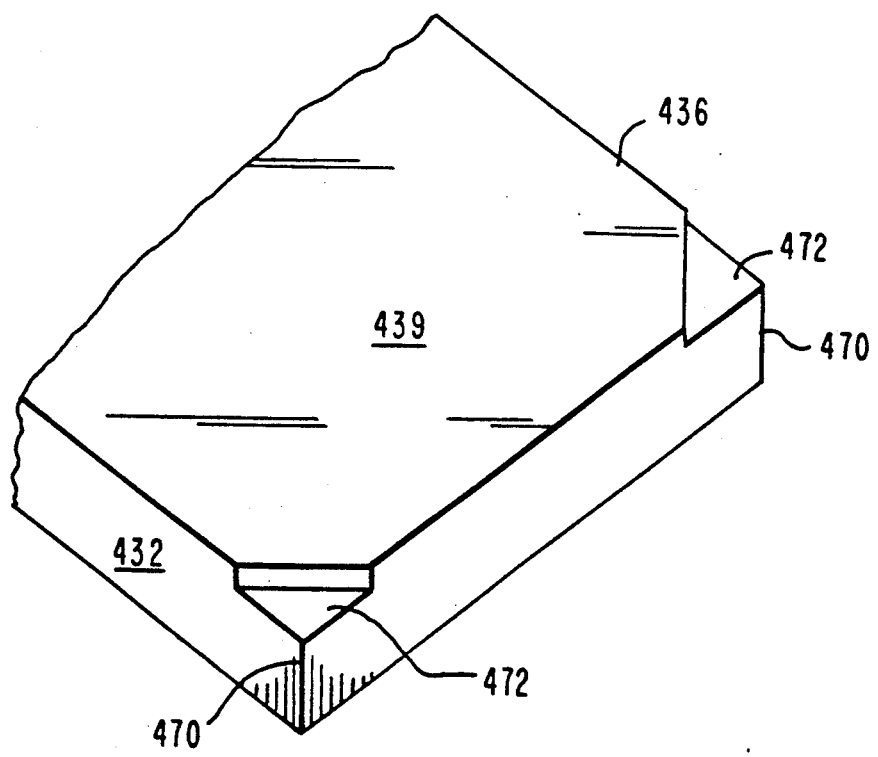
FIG. 16 illustrates a further embodiment of the present invention including beveled edges.

In a further embodiment of the invention, illustrated in FIG. 16, edges 470 of pad 439 on second region 432 are beveled. Beveling comprises removing a portion of air bearing surface 436 at edges 470 to create recessed corners 472. Since the slider may have a tendency to roll during the takeoff or landing operations, edges 470 are beveled to prevent them from digging into the magnetic surface.

In order to provide a more precise understanding of the present invention, the following dimensions are included as being representative of embodiments of the present invention and are not intended to limit the scope of the invention. In one embodiment of the present invention as illustrated in FIG. 10, a slider having a form factor of approximately $4 \times 3 \times 1$ millimeters would have actual dimensions of approximately $X = 4.025$, $Y = 3.0$ and $Z = 0.825$ millimeters. The tapered portion of front pads 138 would have a length M of approximately 0.39 millimeters. The taper angle C, that is the angle between taper surface 137 and air bearing surface 135, would be approximately 10 milliradians. The overall length N of front pads 138 would be approximately 1.0 millimeters. The width P of each front pad would be approximately 1.0 millimeters. The length Q of central region 133 would be approximately 2.025 millimeters. Central region 133 would have a thickness of approximately 300 micrometers, while piezoelectric region 140 overlying the central region would have a thickness of approximately 250 micrometers. In order to ensure that central region 133 remains non air bearing, it should be recessed at at least approximately 20 micrometers below air bearing surfaces 135 and 136. The length R of pad 139 would be approximately 1.0 millimeters.

In a further embodiment of the present invention as illustrated in FIG. 10, a slider having a form factor of approximately $2.5 \times 1.6 \times 0.4$ millimeters would have actual dimensions of approximately $X = 2.545$, $Y = 1.6$ and $Z = 0.425$ millimeters. millimeters. The tapered portion of front pads 138 would have a length M of approximately 0.39 millimeters. The taper angle C, that is the angle between the taper surface and the first air bearing surface would be approximately 10 milliradians. The overall length N of front pad 138 would be approximately 0.6725 millimeters. The width P of front pads 138 would be approximately 0.4 millimeters. The length Q of central region 133 would be approximately 1.2 millimeters. Central region 133 would have a thickness of approximately 150 micrometers, while piezoelectric layer 140 overlying central region 133 would have a thickness of approximately 125 micrometers. In order to insure that the central region remain non air bearing, it should be recessed at least, approximately 20 micrometers below the air bearing surfaces. The length R of second pad 132 would be approximately 0.6275 millimeters.

It is expected that dimensional variations of plus or minus 5% would not significantly change the operating characteristics of the embodiments described above. Dimensional variations of 10% or more may also be acceptable.

Thus by removing the central air bearing surface normally included in an air bearing slider, the present invention provides a distinct advantage over those of the prior art. The lift generated by the air bearing pads at the front and rear becomes substantially independent and the rear surface may be controlled independent of changes in the fly height of the front air bearing surface, enabling the rear air bearing surface to be held extremely close to the magnetic surface.

Additional advantages may be obtained using an air bearing slider according to the present invention. For example, by introducing a programmable fly height the read/write head may be moved away from the magnetic surface except when performing read and write operations. In addition it is possible to relax fabrication tolerances since the fly height may be controlled electronically, thus reducing the cost of manufacturing. An additional advantage of the present invention is that the "stiction" between the magnetic surface and the air bearing slider may be reduced substantially by either naturally warping the slider or flexing it slowly prior to disk start up. In either case, the need for sophisticated textured disks for reducing stiction could be eliminated. Finally, the cross sectional area available for mounting the read/write head is increased substantially over the prior art.

While preferred embodiments of the present invention have been shown and described herein, it would be obvious to those of skill in the art that such embodiments are provided by way of examples only. Numerous variations, changes, and substitutions will now occur to those of skill in the art without departing from the invention. Accordingly, it is intended that the invention be limited only by the spirit and scope of the appended claims.

We claim:

1. An air bearing slider comprising:
    a first region including at least a first pad having at least a first air bearing surface;
    a second region including a first rear pad having at least a first air bearing surface; and
    a central region, joining said first and second regions, said central region being deformable such that deforming said central region adjusts the relative orientation of said air bearing surfaces.

2. An air bearing slider according to claim 1 wherein: said central region is substantially non air bearing.

3. An air bearing slider according to claim 2 wherein: said central region is recessed below said air bearing surfaces.

4. An air bearing slider according to claim 2 wherein: said central region is recessed approximately 20 micrometers below said air bearing surfaces when said central portion is not deformed.

5. An air bearing slider according to claim 2 wherein: said central region is recessed more than 20 micrometers below said air bearing surfaces when said central portion is not deformed.

6. An air bearing slider according to claim 1 wherein: said central region is recessed below said air bearing surface;
    said central region further includes electrically deformable material arranged to deform said central region in response to an electrical signal.

7. An air bearing slider according to claim 6 wherein: said electrically deformable material comprises a piezoelectric material.

8. An air bearing slider according to claim 6 wherein: said electrically deformable material overlies said central region.

9. An air bearing slider according to claim 6 wherein said central region comprises:
    a middle region having a first coefficient of thermal expansion, integrally connected to said first and second regions;
    an active, electrically deformable region, having a second coefficient of thermal expansion, overlying said middle region; and
    a second, deformable region, underlying said middle region.

10. An air bearing slider according to claim 9 wherein:
    said second region is chosen to counteract deformation of said slider resulting from a mismatch between said first and second thermal coefficient of expansion.

11. An air bearing slider, including a leading and trailing edge, comprising:
    a first air bearing region including said leading edge, and further including a tapered region at said leading edge;
    a second air bearing region including said trailing edge;
    a deformable central region, including a non air bearing surface, joining said the first and second air bearing regions, wherein, said central region is adapted to adjust a relative angle between said first and second air bearing regions.

12. An air bearing slider according to claim 11 wherein:
    said central region further includes means to deform said central region in response to an electrical signal.

13. An air bearing slider according to claim 12 wherein:
    said means to deform comprises a layer of a material selected from a group consisting of:
    thermoelectric, electrostrictive, and piezoelectric materials.

14. An air bearing slider according to claim 12 wherein:
    said means to deform comprise electromechanical means.

15. An air bearing slider according to claim 11 wherein said central region includes:
    a recessed surface, said recessed surface being substantially non air bearing;
    a piezoelectric element overlying said central region;
    a read/write head attached to said trailing edge.

16. An air bearing slider, including a leading and trailing edge, comprising:
    a first air bearing region having two air bearing surfaces, separated by a non air bearing region, said first region further including said leading edge and a tapered region at said leading edge;
    a second air bearing region including said trailing edge;
    a deformable central region, including a non air bearing surface, joining said the first and second air bearing regions, wherein, said central region is adapted to adjust a relative angle between said first and second air bearing regions.

17. An air bearing slider according to claim 16 wherein:
    said central region further includes means to deform said central region in response to an electrical signal.

18. An air bearing slider according to claim 17 wherein:
    said means to deform comprises a layer of a material selected from a group consisting of:
    thermoelectric, electrostrictive, and piezoelectric materials.

19. An air bearing slider according to claim 17 wherein:
said means to deform comprise electromechanical means.

20. An air bearing slider according to claim 16 wherein said central region includes:
a recessed surface, said recessed surface being substantially non air bearing;
a piezoelectric element overlying said central region;
a read/write head attached to said trailing edge.

21. An air bearing slider comprising:
a first and second air bearing surface separated by a central non air bearing surface;
said first air bearing surface including taper flats; and
an electrically deformable region arranged to bend said central non air bearing surface.

22. An air bearing slider according to claim 21, wherein:
said first air bearing surface comprises two pads separated by a second non air bearing region connected to said central non air bearing surface.

23. An air bearing slider according to claim 22 wherein:
said slider further includes a rail disposed on said non air bearing surfaces and extending from said second air bearing surface to said first region of said slider; and
said rail being substantially non air bearing.

24. An air bearing slider according to claim 21 wherein;
said slider further includes a thermally deformable region arranged to counteract deformation caused by a mismatch between a coefficient of thermal expansion of said central region and a coefficient of thermal expansion of said electrically deformable region.

25. An air bearing slider according to claim 24 wherein:
said electrically deformable region overlies said central region; and said thermally deformable region underlies said central region.

26. An air bearing slider according to claim 21 wherein:
said second air bearing surface includes beveled regions at corners thereof.

27. An air bearing slider including leading and trailing edges comprising:
first and second regions separated by a deformable, non air bearing region;
electrically deformable means disposed to deform at least said central region;
a plurality of first pads disposed on said first region and including first air bearing surfaces, said first pads being separated by non air bearing surfaces;
taper flat regions disposed on said pads at said leading edge;
second pad, including second air bearing surface, disposed on said second region; and
magnetic detection means disposed on said trailing edge.

28. A slider according to claim 27 wherein:
said slider has a form factor of approximately $4 \times 3 \times 1$ millimeters.

29. A slider according to claim 28 wherein:
said slider has a length of approximately 4.025 millimeters;
said slider has a width of approximately 3.0 millimeters; and
said slider has a thickness of approximately 0.825 millimeters.

30. A slider according to claim 29 wherein:
said taper flat regions have a length of approximately 0.39 millimeters;
said taper flat regions form an angle of approximately 10 milliradians with said first air bearing surfaces;
said first pads have a length of approximately 1.0 millimeters;
said first pads have a width of approximately 1.0 millimeters;
said central region has a length of approximately 2.025 millimeters; and
said second pad covers substantially all of said second region and has a length of approximately 1.0 millimeters and a width of approximately 3.0 millimeters.

31. A slider according to claim 30 wherein:
said electrically deformable means comprises a layer of electrically deformable material having a thickness of approximately 250 micrometers;
said central region has a thickness of approximately 300 micrometers;
said central region is recessed at lease 20 micrometers below said first and second air bearing surfaces.

32. A slider according to claim 27 wherein:
said slider has a form factor of approximately $2.5 \times 1.6 \times 0.4$ millimeters.

33. A slider according to claim 32 wherein:
said slider has a length of approximately 2.545 millimeters;
said slider has a width of approximately 1.6 millimeters; and
said slider has a thickness of approximately 0.425 millimeters.

34. A slider according to claim 33 wherein:
said taper flat regions have a length of approximately 0.39 millimeters;
said taper flat regions form an angle of approximately 10 milliradians with said first air bearing surfaces;
said first pads have a length of approximately 0.6725 millimeters;
said first pads have a width of approximately 0.4 millimeters;
said central region has a length of approximately 1.2 millimeters; and
said second pad covers substantially all of said second region and has a length of approximately 0.6275 millimeters and a width of approximately 3.0 millimeters.

35. A slider according to claim 34 wherein:
said electrically deformable means comprises a layer of electrically deformable material having a thickness of approximately 125 micrometers;
said central region has a thickness of approximately 150 micrometers;
said central region is recessed at lease 20 micrometers below said first and second air bearing surfaces.

36. A method of modifying the height of an air bearing slider including at least a first air bearing surface, a second air bearing surface, and a deformable central portion joining said first and second air bearing surfaces comprising the steps of:
deforming said central portion to adjust the relative orientation of said first and second air bearing surfaces;
measuring the change in slider height;
deforming said central portion;

repeating the previous steps until a desired height is achieved.

37. A method of controlling the fly height of a read/write head attached to a rear surface of an air bearing slider including first and second air bearing regions separated by an electrically deformable, non air bearing central region, said method comprising the steps of:
electrically exciting said central region;
deforming said central region to a curvature of between zero and 400 microradians.

* * * * *